United States Patent
Lee et al.

(10) Patent No.: US 8,514,983 B2
(45) Date of Patent: Aug. 20, 2013

(54) SIGNAL SELECTION APPARATUS AND METHOD THEREOF

(75) Inventors: Chung-Hsiung Lee, Hsinchu Hsien (TW); Yu Hsien Ku, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 394 days.

(21) Appl. No.: 12/984,200

(22) Filed: Jan. 4, 2011

(65) Prior Publication Data

US 2011/0268171 A1    Nov. 3, 2011

(30) Foreign Application Priority Data

Apr. 30, 2010    (TW) ................................ 99113939 A

(51) Int. Cl.
  *H04L 27/06*    (2006.01)
  *H04L 7/04*    (2006.01)
  *H04J 3/06*    (2006.01)

(52) U.S. Cl.
  USPC ........................... 375/340; 375/362; 370/509

(58) Field of Classification Search
  USPC ......... 375/260, 316, 340, 343, 354, 362–366; 370/203, 208, 210, 504, 509–515; 708/423–426
  See application file for complete search history.

(56) References Cited

U.S. PATENT DOCUMENTS

| | | | | |
|---|---|---|---|---|
| 7,953,141 B2* | 5/2011 | Hasegawa et al. | ............ | 375/148 |
| 2003/0228887 A1* | 12/2003 | Kishigami et al. | ............ | 455/561 |
| 2005/0008088 A1* | 1/2005 | Liu et al. | ........................ | 375/260 |
| 2005/0036538 A1* | 2/2005 | Niederholz et al. | ........... | 375/148 |
| 2005/0078639 A1* | 4/2005 | Oura | ............................. | 370/335 |
| 2006/0165197 A1* | 7/2006 | Morita et al. | .................. | 375/326 |
| 2007/0047629 A1* | 3/2007 | Fulghum | ........................ | 375/148 |
| 2007/0086329 A1* | 4/2007 | Glazko et al. | ................. | 370/208 |
| 2009/0092175 A1* | 4/2009 | Oura | ............................. | 375/148 |

FOREIGN PATENT DOCUMENTS

CN    1366742 A    8/2002
CN    101449480 A    6/2009

* cited by examiner

*Primary Examiner* — Tesfaldet Bocure
(74) *Attorney, Agent, or Firm* — Edell, Shapiro & Finnan, LLC

(57) ABSTRACT

A signal selection apparatus for selecting a target signal from a plurality of input signals is provided. The input signals correspond to different time indexes. The signal selection apparatus comprises a weight calculation unit for generating a corresponding weight respectively for each of the input signals, a processing unit for processing the input signals respectively to generate a plurality of processed signals according to the weights, and a selection unit for selecting a signal with a larger energy from the processed signals as the target signal, wherein the weights are used for adjusting an individual energy of the input signals such that the time index of the target signal is earlier within the input signals.

18 Claims, 9 Drawing Sheets

SIGNAL SELECTION APPARATUS AND METHOD THEREOF

CROSS REFERENCE TO RELATED PATENT APPLICATION

This patent application is based on a Taiwan, R.O.C. patent application No. 099113939 filed on Apr. 30, 2010.

FIELD OF THE INVENTION

The present invention relates to a signal selection apparatus and method thereof, and more particularly to an apparatus used in a communication system for signal selection and method thereof.

BACKGROUND OF THE INVENTION

An equalizer is an important component in a communication system. Signal distortion and increase of data error rate usually occur due to multipath interference and the shadow effect caused by objects blocking a transmission path. An equalizer is therefore used for channel compensation to mitigate interference and noise caused by channel effects.

FIG. 1 depicts a diagram of a decision feedback equalizer 10 (DFE). The decision feedback equalizer 10 comprises a channel matching filter (CMF) 110, a feed-forward equalizer (FFE) 130, an inter-symbol interference removing unit (ISI) 150, a slicer 170 and a feedback equalizer (FBE) 190.

The decision feedback equalizer 10 receives a transmitted signal S0 from a transmitter, and signal-to-noise ratio (SNR) of the communication signal S0 is improved after the signal passes through the channel matching filter 110. The communication signal S0 then goes through the feed-forward equalizer 130, the inter-symbol interference removing unit 150 and the feedback equalizer 190 to eliminate the interference in the channel paths. Finally, the decision feedback equalizer 10 utilizes the slicer 170 for determining the received signal.

One drawback of the decision feedback equalizer 10 is that it may only remove the symbol interference of past data but not the interference of future data. And thus, for channels with great delay spread, the decision feedback equalizer 10 may be significantly influenced by the inter-symbol interference which causes high output data error rate.

SUMMARY OF THE INVENTION

An object of the present disclosure is to provide a signal selection apparatus and method thereof used in a communication receiver to mitigate inter-symbol interference.

The present disclosure describes a signal selection apparatus that selects a target signal from a plurality of input signals, wherein the input signals correspond to different time indices, and the device comprises: a weight calculation unit, for generating a corresponding weight for each of the input signals; a processing unit, for generating a plurality of processed signals; and a selection unit, for selecting a signal of greater energy to be the target signal. The weights calculated are used to adjust the individual energy of each of the input signal, so a target signal may be the signal that of an earlier index.

The present disclosure further describes a signal selection method for selecting a target signal from a plurality of input signals, where the input signals corresponds to different time indices, the method comprising: generating a corresponding weight for each of the input signals; processing the input signals according to their weights to generate a plurality of processed signals; and selecting the signal of greater energy as the target energy from the processed signals; where the weights are used for adjusting individual energy of the input signals, so the target signal shall be the signal of an earlier time index.

The present disclosure describes a signal selection apparatus and method thereof for mitigating precursor signal interference in a wireless channel having severe multipath interference or channel fading, by adjusting the energy of the input signal of the selection unit so the selection unit may tend to select a main cursor that corresponds to an earlier time index.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Many of the present wireless communication systems use multi-carriers for data transmission, for example, the orthogonal frequency division multiplexing (OFDM) technique applied in the wireless local area network (WLAN) IEEE 802.11a.

Figure 2:
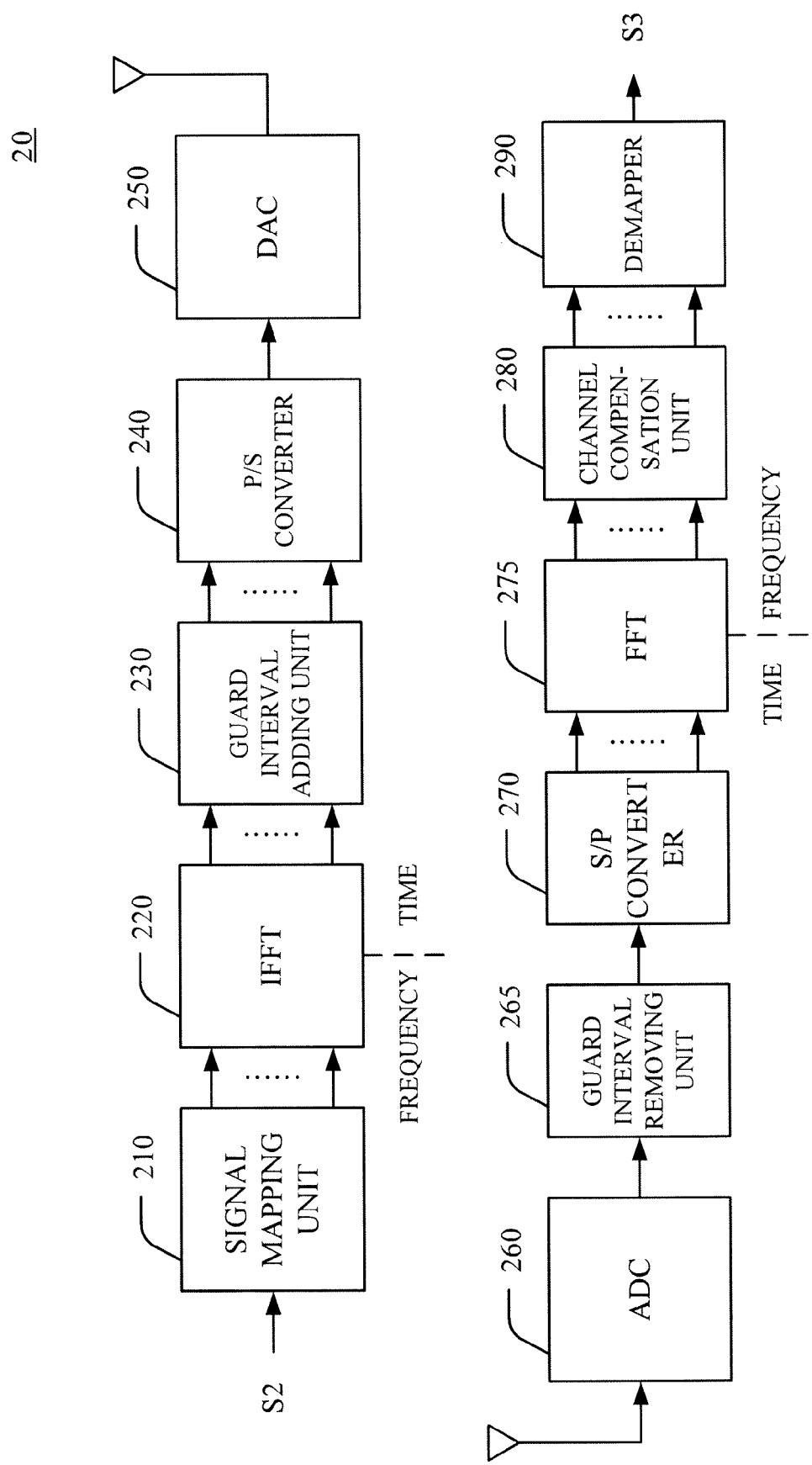
FIG. 2 is a functional diagram of an OFDM system.

FIG. 2 is a block diagram of an OFDM communication system. The OFDM system 20 comprises a signal mapping unit 210, an inverse fast Fourier transform (IFFT) unit 220, a guard interval adding unit 230, a parallel-to-serial (P/S) converter 240, a digital-to-analog converter (DAC) 250, an analog-to-digital converter (ADC) 260, a guard interval removing unit 265, a serial-to-parallel (S/P) converter 270, a fast Fourier transform (FFT) unit 275, a channel compensation unit 280, and a signal demapping unit 290.

The transmitting end Tx of the OFDM system 20 allocates an input signals S2 via the signal mapping unit 210 into N different sub-channels in frequency domain for transmission, then the system transforms the input signals in different frequency domain into time domain signals by the inverse fast Fourier transform (IFFT) unit 220, and the time domain signals are added with a guard interval by the guard interval adding unit 230. The processed signals are then transmitted to wireless channels via the parallel to serial convertor 240 and the digital-to-analog convertor 250.

The receiving end Rx of the OFDM system 20 receives signals sent from the transmitting end Tx and samples the received signals via the analog-to-digital (ADC) converter 260 and then the guard intervals in the received signals are removed via the guard interval removing unit 265, then, the signals are fed to the fast Fourier transform (FFT) unit 275 for frequency domain conversion, also, the signals are processed by the equalizer 280 to compensate the channel response in transmission. Finally, the output signals S3 are demodulated utilizing the demapping unit 290.

Each set of N inverse Fourier transformed points of the output forms a symbol. Due to the channel impulse response (CIR), inter-symbol interferences often occur among the symbols transmitted through the wireless communication channels. Thus, a guard interval is desirable to add into the symbols to avoid inter-symbol interference. And commonly, cyclic prefix (CP) is used for adding the guard interval, the method prefixing a symbol with a repetition of the end as the guard interval.

In this way, under the circumstances that the length of the channel impulse response does not exceed the guard interval, inter-symbol interferences may be avoided, and the N sub-channels can be independent and not interfere with each other. However, before removing the guard interval, the receiving end of the guard interval removing unit 265 needs to determine the correct initial position of the time domain sampling signal for input to the fast Fourier transform unit 275, that is, the boundaries of a symbol, to effectively avoid the inter-symbol interference.

In the OFDM system 20, a frame comprises a predetermined short preamble having time domain periodicity for the purpose of signal synchronization. After the short preamble, the frame may include a predetermined frequency domain signal, that is, a pilot signal, or the so called long preamble, for channel estimation in the frequency domain as an ease of the channel compensation in the frequency domain for the subsequent data symbols.

Before the long preamble, a guard interval may be added. A guard interval may also be inserted in between every two data symbols, to avoid inter-symbol interference. The receiving end utilizes periodicity and the related character for determining the appropriate starting point and the subsequent data symbols to remove the guard interval and also utilizes that the same as the starting reference for the subsequent inputs of the fast Fourier transform unit.

Figure 3:
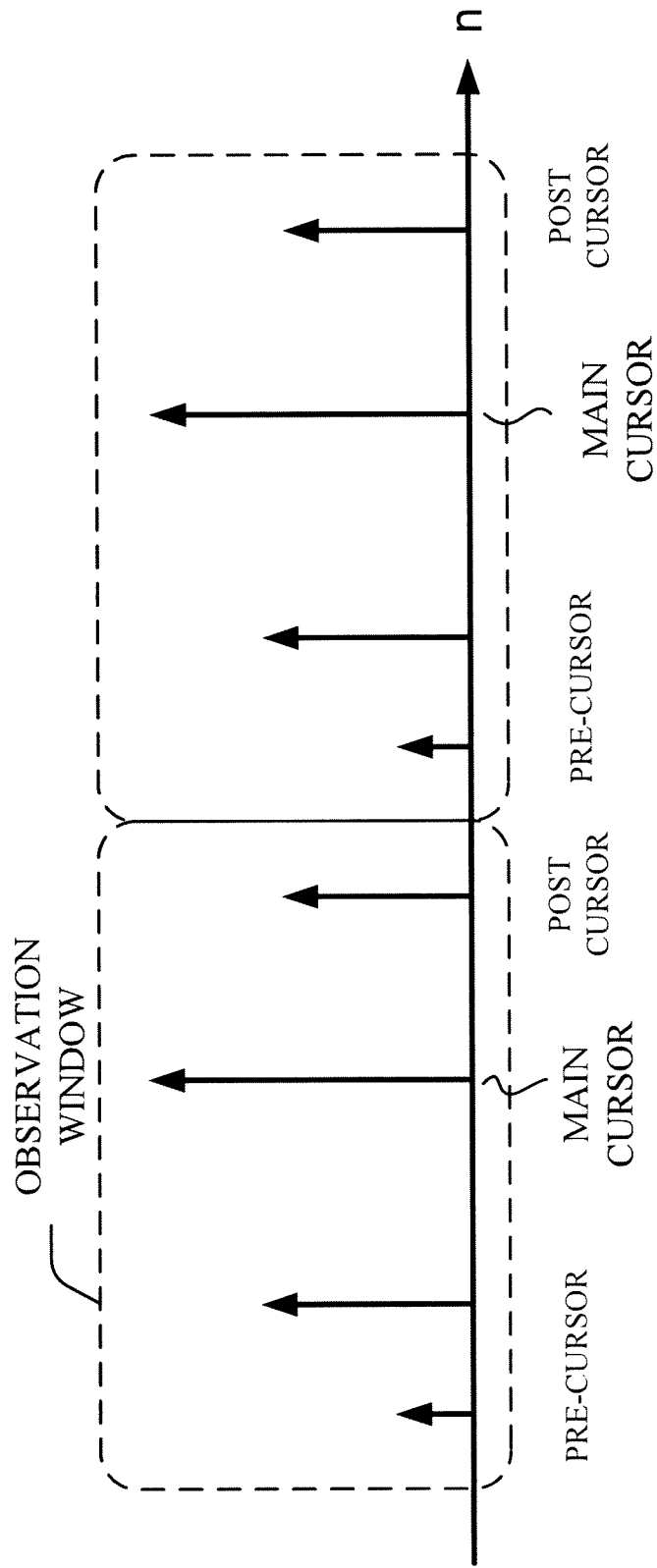
FIG. 3 illustrates the periodicity of channel impulse response.

Due to the periodicity of the short preamble, the channel impulse response estimation value may also be represented periodically within the window, if the window length for viewing the output result of the matching filter is N, as depicted in FIG. 3. The signal of greatest energy is called the main cursor, and the signal prior to the main cursor in time index n is called the precursor, and the signal after the main cursor in time index n is called the post-cursor.

When determining symbol boundary reference points, it is desired to detect the peak value in the observation window, then an early range is set to include the range prior to the peak value, to cover the preamble of the channel impulse response. Ideally, within a special time zone, such as a specific block time, a symbol time or an observation window, the receiving end shall receive only a single input signal. However, due to multipath interference, although the receiving end only transmits a single signal, the receiving end may receive the single signals, at different time indices, transmitted from the transmission end, as depicted in FIG. 3. Thus, it is desirable that the receiving end selects a target signal from a plurality of input signals, as the single signal transmitted from the transmission end.

In a communication environment of greater delay spread, the guard interval of the long preamble is often miscalculated due to the delay, and thus it causes misjudgment of the timing for long preamble signal and the subsequent data symbols to input into the fast Fourier transform unit 275. For example, in a wireless channel with severe multipath interference or channel fading, when the decision feedback equalizer (not shown in the figure) is used for mitigating the inter-symbol interference and the inter-carrier interference, the post cursor signals may be removed via the feedback equalizer, but the precursor signal having long delay time and high energy is hard to be removed.

Accordingly, in a wireless channel environment with severe multipath interference and channel fading, if the peak value signal selected by the guard interval removing unit 265 may be shifted toward the direction of earlier index, then the precursor signals having high energy and long spread time delay may be reduced. Thus, how to select an adequate main cursor to reduce the precursor signal interference is of a great significance.

Figure 4:
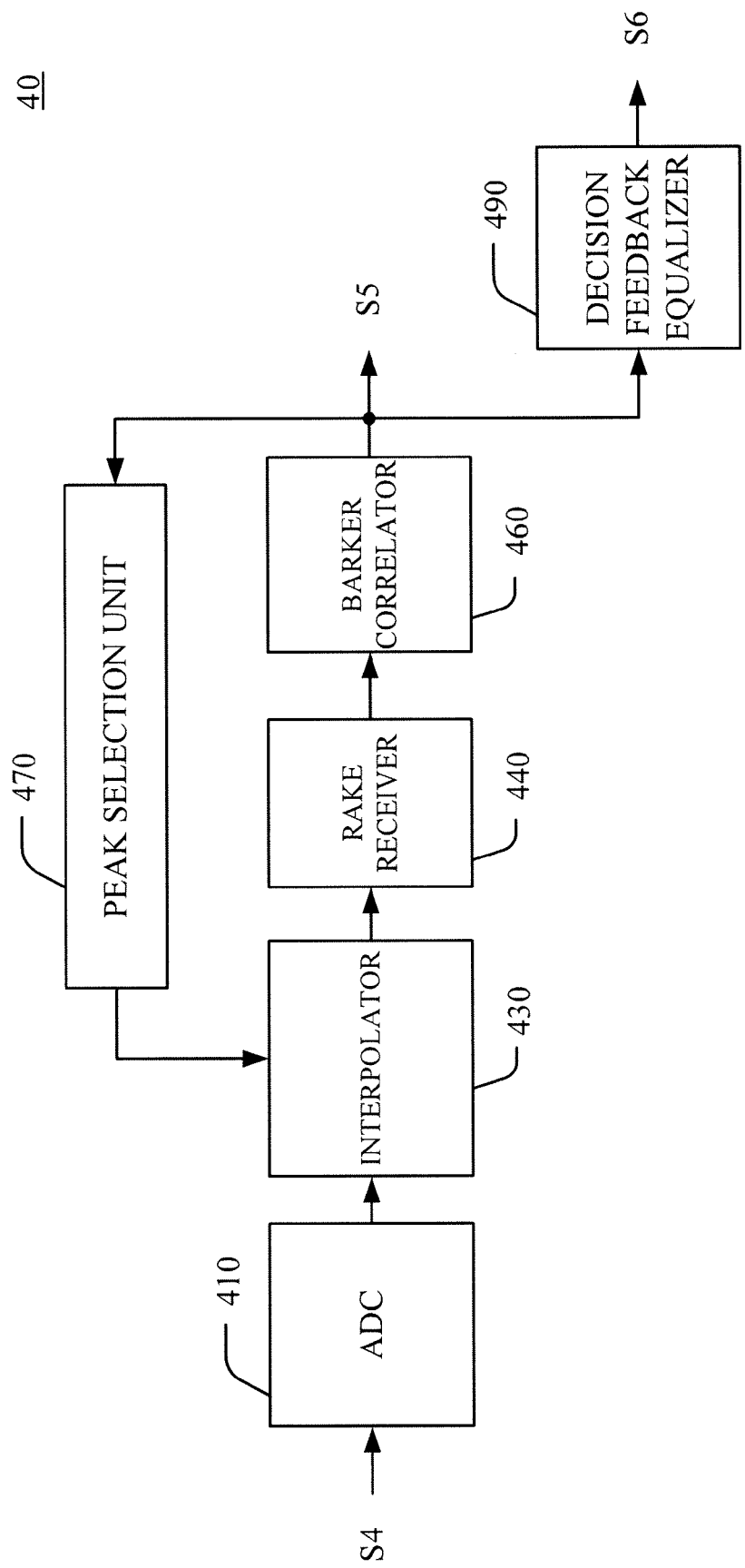
FIG. 4 is a function diagram depicting a receiving apparatus of a IEEE 802.11b wireless network.

Similarly, a single-carrier system may also have the same problem, and thus the present disclosure may also be applied to a single-carrier system, for example, the wireless network system IEEE 802.11b. FIG. 4 is a receiving apparatus diagram of the wireless network system IEEE 802.11b. The receiving apparatus 40 comprises an analog-to-digital converter 410, an interpolator 430, a rake receiver 440, a Barker correlator 460, a peak searching unit 470 and a decision feed-back equalizer 490.

Figure 1:
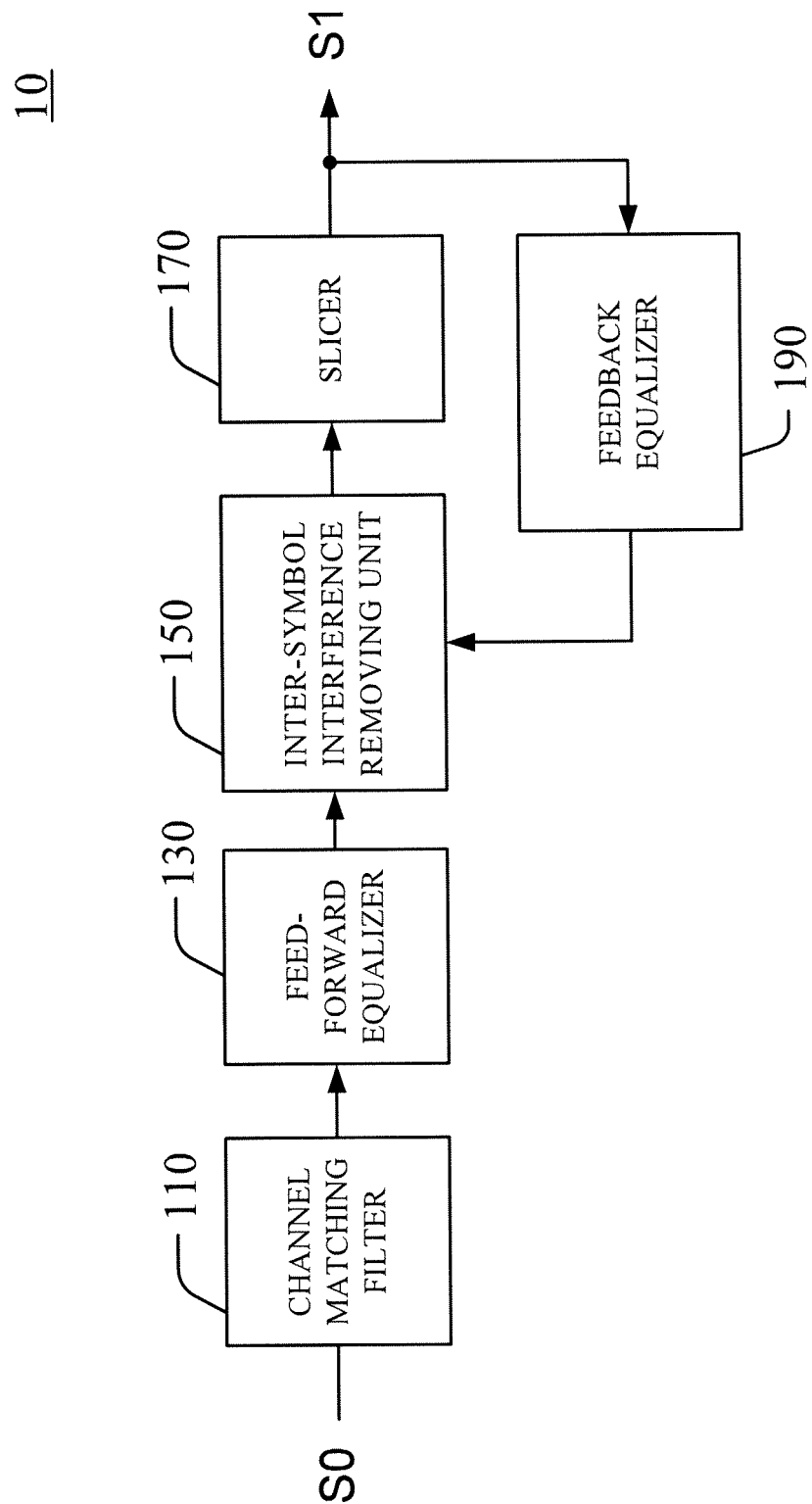
FIG. 1 depicts a decision feedback equalizer.

The analog-to-digital convertor 410 digitizes the input signals S4 into digital signals, and the digitized signals are interpolated through the interpolator 430 to rebuild channel response, then, a demodulation is processed through the rake receiver 440. Finally a first output signal S5 is generated after compensation of the multipath attenuation through the Barker correlator 460. The first output signal S5 is fed to the peak searching unit 470 for peak value selection and it is also fed to the decision feedback equalizer 490 for subsequent processing. For example, the decision feedback equalizer 490 may be realized according to the embodiment in FIG. 1.

The carrier frequency of IEEE 802.11b is 2.4 GHz and may provide multiple transmission rates at 1, 2, 5.5, and 11 Mbit/s (bps). The system operation includes two steps. the first step is the boot-loader/header step, that uses the Barker code, for providing the timing, carrier recovery, and channel estimation when receiving signals with the transmission rate of 1 Mbps and 2 Mbps. When the boot-loader and the header steps are completed, the second step of high speed data transmission are carried out, in which the system switches to a complementary code keying (CCK) mode outputting the second output signal S6 for proceeding the complementary code keying demodulation at 5.5 Mbps and 11 Mbps.

The timing recovery of IEEE 802.11b utilizes the Barker code correlation for detecting the 1 Mbp transmitted data, for example, using the corresponding location of the preamble on the time axis to calculate the demodulated complementary code keying transmitted at 11 Mbps and the location of other high speed transmitted data. After the first signal S5 is outputted by the Barker correlator, the peak searching unit 470 selects the data sent from the peak (value) signal for timing recovery and signal synchronization.

The peak searching unit 470 detects the symbol boundaries using the 1 Mbps transmission data of the Backer spread spectrum, and utilizing the symbol boundary to calculate the complementary code keying demodulation at 11 Mbps or other symbol timing boundaries transmitted at different transmission rate. Thus, the symbol boundary detected at 1 Mbps must be sufficiently precise and accurate, else, data misreading may occur.

However, interference including noise, multipath and frequency shifting may greatly interfere the data transmission through air, especially in an environment where the multipath and channel fading are severe causing long delay time and precursor signal having high energy. And thus, the present disclosure provides a signal selection apparatus and method thereof for mitigating the precursor signal interference, by weighting the corresponding time index of the input signals before the signal peak value selection, to increase the chances that the peak value of the input signal appearing corresponding to the earlier time index and lower the barrier for finding the symbol boundaries.

Figure 5:
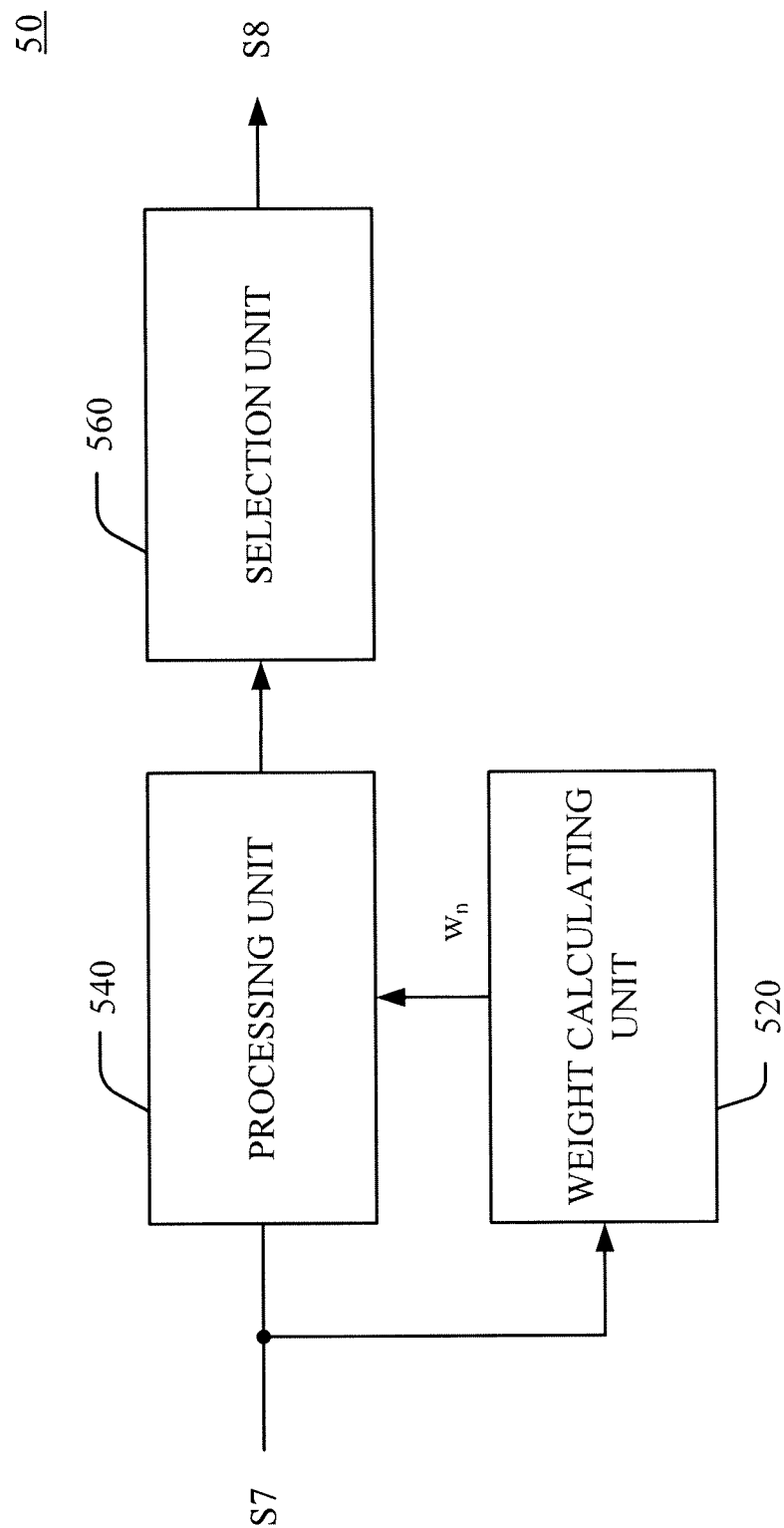
FIG. 5 is a functional diagram of the signal selection apparatus corresponding to an embodiment of the present disclosure.

FIG. 5 is a block diagram of the signal selection apparatus of an embodiment of present disclosure. The signal selection apparatus 50 comprises a weight calculation unit 520, a processing unit 540, and a selection unit 560. The signal selection unit 50 may be used at the receiving end, in the guard interval removing unit 265 as depicted in FIG. 2 or in the peak searching unit 470 as depicted in FIG. 4.

The weight calculation unit 520 generates a weight $w_n$ according to the corresponding time index n for each of the input signals S7. In the present embodiment, when one input signal S7 has a later time index n, the weight calculation unit 520 generates a smaller weight $w_n$; in contrast, when one input signal S7 has a earlier time index n, the weight calculation unit 520 generates a greater weight $w_n$. The time index n is represented periodically, that is, assuming the observation window has the length L, then n=0, 1, 2, ..., L, and during the transition of different observation windows, the time index n is reset to 0 for the calculation.

Figure 6:
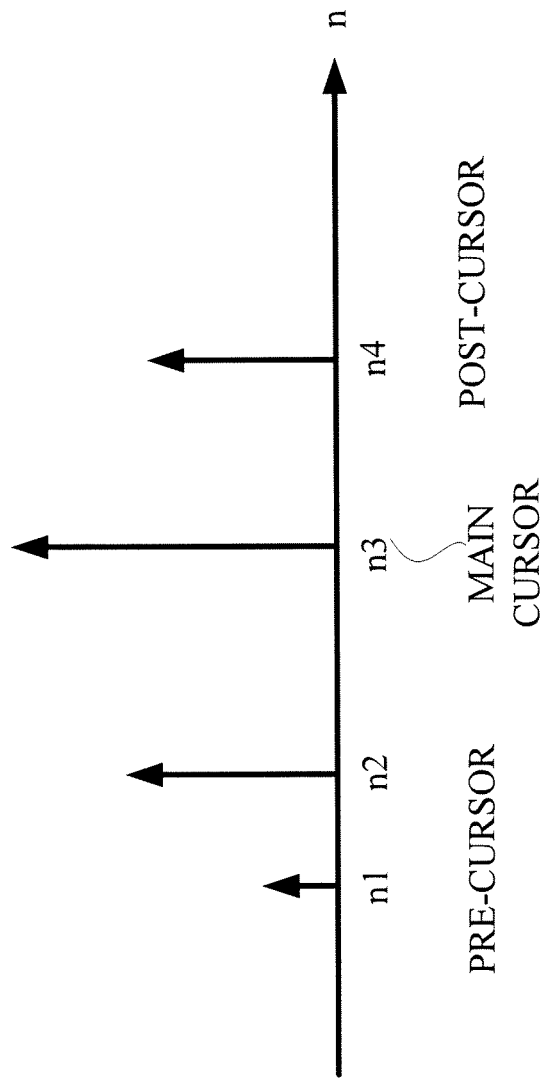
FIG. 6 is a diagram illustrating the channel impulse response of the input signal.

FIG. 6 is the channel impulse response diagram of the input signal S7 of the present embodiment. The horizontal axis is the time index n, and the vertical axis is the signal energy. There exist different channel impulse responses at different time indexes n1, n2, n3 and n4 respectively, where the signal of the greatest energy, called the main cursor, is at the time index n3, where at both the time index n1 and n2 a precursor exists and at the time index n4 a post cursor exists.

Figure 7:
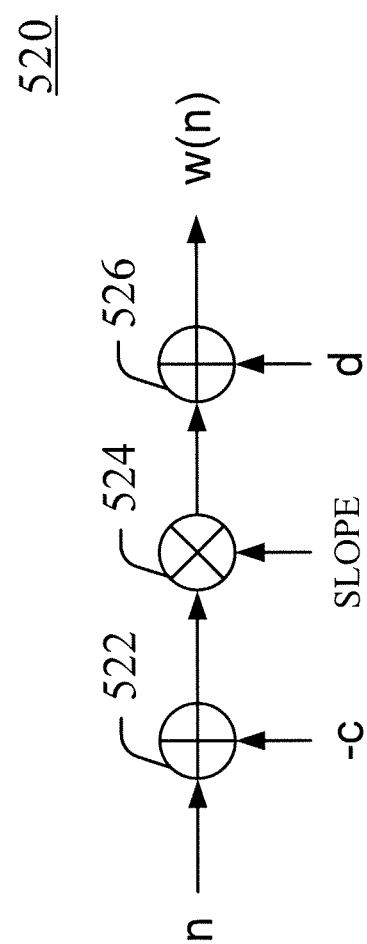
FIG. 7 is a functional diagram of the weight calculation unit in an embodiment.

FIG. 7 is the weight calculation unit diagram of an embodiment. In the embodiment, the weight searching unit 520 comprises the adders 522, 526 and a multiplier 524. The weight calculation unit 520 is structured for realizing a weight function w(n), wherein in an embodiment the weight function w(n) is as follows:

$$w(n) = slope*(n-c)+d, n=0, 1, 2, \ldots, L.$$

$$\text{if } w(n) > w\_max, w(n) = w\_max,$$

$$\text{if } w(n) < w\_min, w(n) = w\_min,$$

wherein the weight function w(n) calculates the weight $w_n$ according to the time index n, where L is the length of the observation window; n is the time index of the input signal S7, which is represented periodically, and the time index n is reset during the transition of different observation windows; c is the time index of the main cursor of the previous observation window, that is, the calculation of the weight function w(n) is iterative, where the default value may depend on the users, for example, it may be 10, and number of the iteration may also be set by the user; w_max is the upper bound of w(n), that is, the weight $w_n$ calculated from the weight function w(n) should not exceed w_max, and if the weight $w_n$ calculated exceeds w_max, then it may be set as the new w_max; w_min is the lower bound of the weight function w(n), that is, if the weight $w_n$ calculated is less than w_min, then it is set as the new lower bound; and the slope and d may be adjusted according to the channel condition.

The processing unit 540 processes the input signals S7 separately according to the weight $w_n$, to generate a plurality of processed signals. A time index n corresponds to one weight $w_n$, and the input signals S7 of the time index n are processed according to the weights, to generate processed signals. In a preferred embodiment, the weight $w_n$ may be multiplied with the energy of the input signal S7 of their corresponding time index n, to generate a processed signal of the corresponding time index n. For input signal S7 of a later time index n, the weight calculation unit 520 generates a smaller weight $w_n$ compared to that of the earlier time index, and a processed signal of smaller energy is generated from multiplying the input signal S7 with the smaller weight $w_n$; the weight calculation unit 520 generates a greater weight $w_n$ for the input signals S7 of the earlier time index n, and when the input signal S7 multiplies with a greater weight $w_n$, a processed signal of greater energy is generated. That is, after being processed by the processing unit 540, the energies of the input signals S7 are adjusted such that it is more likely that the peak values of the processed signals appear at earlier time indexes. The processing unit 540 in the present embodiment may be realized using a multiplier.

Figure 8:
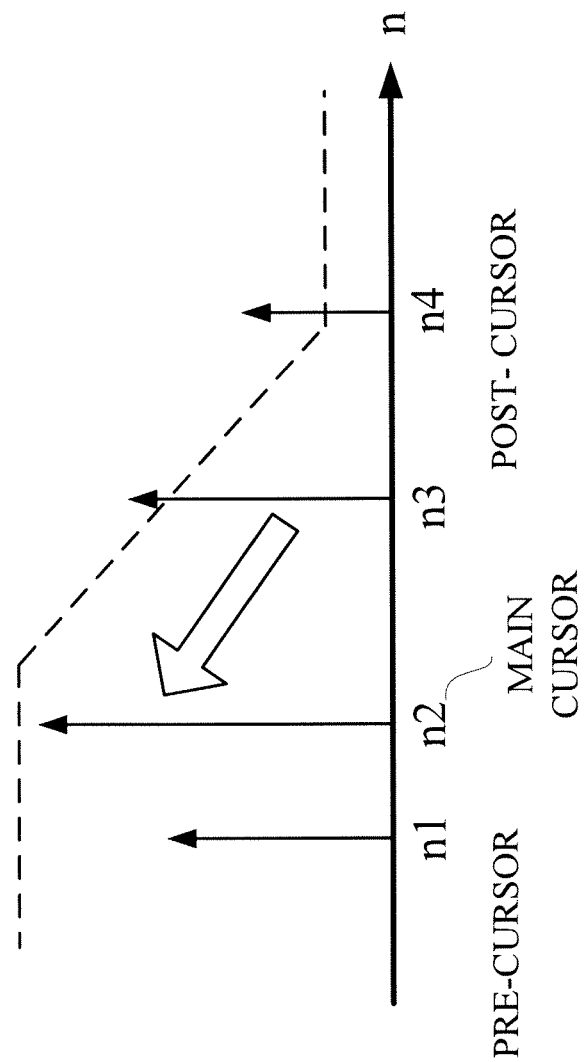
FIG. 8 illustrates the channel impulse response of the processed signal.

FIG. 8 is a schematic view illustrating the channel impulse response of the processed signals in one embodiment, the dashed lines in FIG. 8 represents a weight function. Reference is also made to FIG. 6 and FIG. 8. In FIG. 8, there is one impulse response at each one of the time indexes n1, n2, n3 and n4, wherein the main cursor signal having greater energy is at the time index n2, a precursor signal is at the time index n1, and a post cursor signal is at the time index n3 and n4.

FIG. 6 illustrates an input signal S7 that has not been processed by the processing unit 540, whereas FIG. 8 illustrates an input signal S7 that has been processed by the processing unit 540. The input signal S7 after being processed by the processing unit 540, its peak value (the main cursor of greater energy) tends to move toward the direction of earlier time index. In the embodiment, the main cursor shifts from the original time index n3 to the new time index n2, and thus, the precursor signals located prior to the main cursor has reduced in number and left with only one precursor signal at time index n1.

Therefore, weighting the corresponding time index of the input signals before the signal peak value selection can mitigate the precursor signal interference having long delay time and high energy applied in a wireless channel having severe multipath interference or channel fading. In this way, it is more likely that the peak value of the input signal appears at an earlier time index so that the interference caused by the precursor signals will decrease; accordingly, an adequate symbol boundary can be selected.

The selection unit 560 selects the signal having the greatest energy to be the target value. In FIG. 8, as an example, the main cursor signal having greater energy (located at time index n2) is the target signal. The time index of the main cursor of the processed signal may have an earlier time index than the time index of the input signal S7 in FIG. 6. The selection unit 560 may be any peak searching apparatus.

In an embodiment, for example, in the IEEE 802.11b system for wireless transmission, since the precursor signals are periodic and the multipath channel impulse response usually do not change, hence, in every observation window, the selection unit 560 may use a counter for counting the number of times that each of the time indices has the peak energy value, and when that number exceeds a default value, the channel impulse response of that specific time index may be recognized as the target signal.

Figure 9:
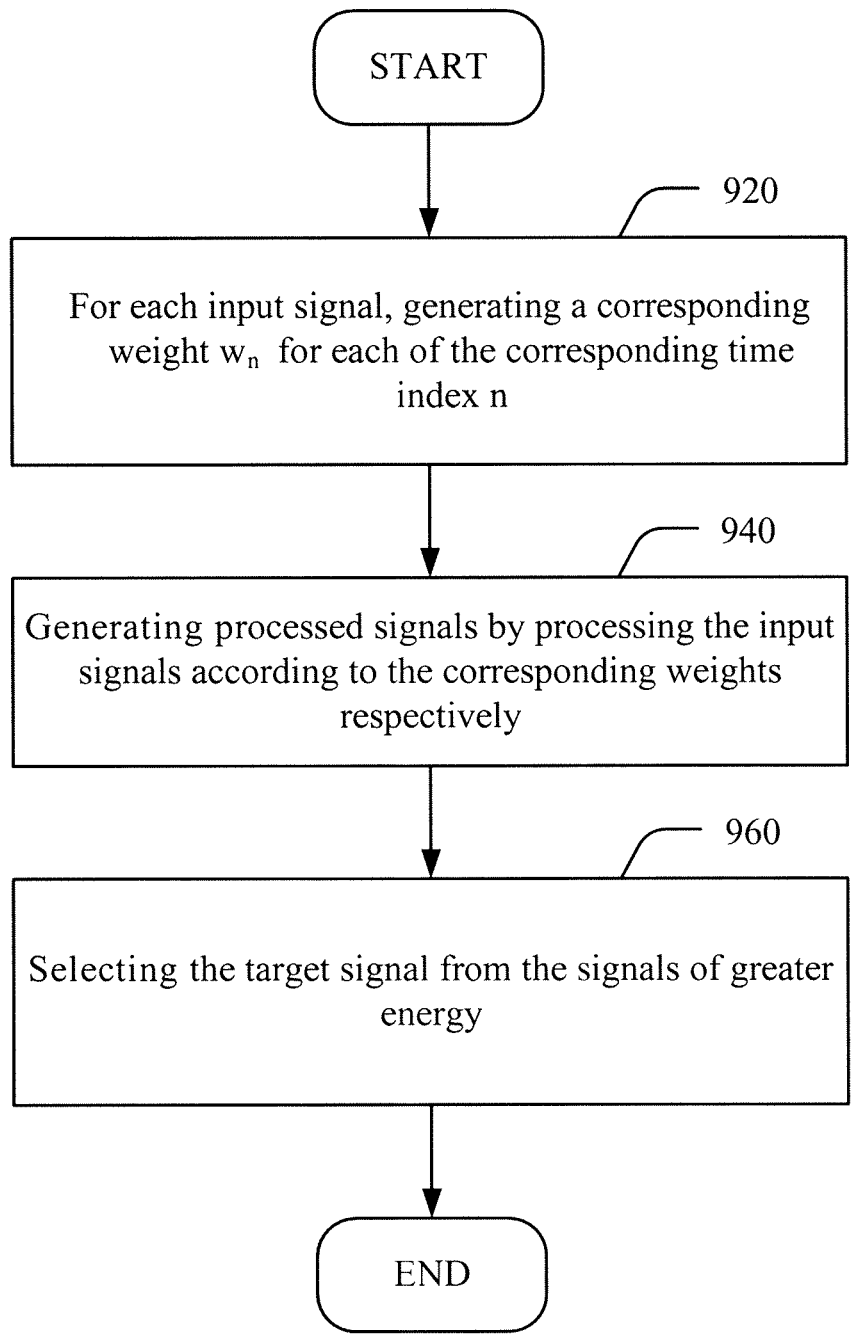
FIG. 9 depicts the signal selection method and flow according to an embodiment of the present disclosure.

FIG. 9 depicts the signal selection flow according to the present embodiment. In Step 920, for each input signal, a corresponding weight $w_n$ is generated for each corresponding time index n. In this embodiment, when the input signal has a later time index n, a smaller weight $w_n$ is generated; when the input signal has an earlier time index n, a greater weight $w_n$ is generated.

The method for generating a weight may be realized by a weight function w(n), for example, the weigh function w(n) may be as follows:

$$w(n)=\text{slope}*(n-c)+d, n=0, 1, 2, \ldots, L.$$

$$\text{if } w(n)>w\_\text{max}, w(n)=w\_\text{max},$$

$$\text{if } w(n)<w\_\text{min}, w(n)=w\_\text{min}.$$

the weight function w(n) calculates the weight $w_n$ according to the time index n, where L is the length of the observation window; n is the time index of the input signal, which is represented periodically, and the time index n may be reset during the transition of different observation windows; c is a time index of the main cursor of the previous observation window, that is, the calculation of the weight function w(n) is iterative, where the default value may depend on the users, may be 10, for example, and number of the iteration may also be set by the user; w_max is the upper bound of w(n), that is, the weight $w_n$ calculated from the weight function w(n) may not exceed w_max, and if the weight $w_n$ calculated exceeds w_max, then it may be set as the new w_max; w_min is the lower bound of the weight function w(n), that is, if the weight $w_n$ calculated is less than w_min, then it is set as the new lower bound; and the slope and d may be adjusted according to the channel condition.

In step 940, processed signals are generated by processing the input signals according to the corresponding weights respectively. One time index may correspond to one weight. Because one processed signal is generated according to one weight that corresponds to one time index, a time index also corresponds to one processed signal. In an embodiment, the weight may be multiplied with the energy of the input signal of time index n, as the energy of the processed signal of the time index n. When the input signal has a later time index, the input signal is multiplied with a smaller weight and thus be a processed signal of less energy; when the input signal has an earlier time index, the input signal is multiplied with a greater weight and thus be generate a processed signal of greater energy. That is, a processed signal may be generated by adjusting the energy of the input signals, so the peak values of the processed signal my have greater chances to appear at an earlier time index.

In step 960, the target signal is selected from the signals of greater energy. In an embodiment, for example, in the IEEE 802.11b system for wireless transmission, since the precursor signals are periodic and the multipath channel impulse response usually do not change, hence, in every observation window, the selection unit 560 may use a counter for counting the number of times that each of the time index having the peak value, and when that number exceeds a default value, the channel impulse response of that corresponding time index may be recognized as the target signal. The peak values of the processed signal my have greater chances for appearing at an earlier time index by adjusting the energy of the input signals after the signals have been weighted, to reduce the precursor signal interference.

In summary, the present disclosure provides a signal selection apparatus and method thereof for mitigating the precursor signal interference having long delay time and high energy applied in a wireless channel having severe multipath interference or channel fading, by weighting the corresponding time index of the input signals before the signal peak value selection, to increase the chances that the peak value of the input signal appearing corresponding to the earlier time index.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A signal selection apparatus that selects a target signal from a plurality of input signals where the input signals correspond to a plurality of different time indices, the apparatus comprising:
    a weight calculation unit, for generating corresponding weights for each of the input signals, the weights being associated with the time indices respectively;
    a processing unit, for adjusting energies of the input signals according to the weights respectively, to generate a plurality of processed signals; and
    a selection unit, for selecting one processed signal which has the greatest energy among the processed signals as the target signal.

2. The apparatus according to claim 1, wherein the weight calculation unit generates the weights in a way that the weights are greater at the earlier time indices.

3. The apparatus according to claim 2, wherein the weight calculation unit comprises:
    a first adder, for adding the time indices to a first coefficient respectively to generate a plurality of first values;
    a multiplier, for multiplying the first values by a second coefficient respectively to generate a plurality of second values; and
    a second adder, for adding the second values to a third coefficient respectively to generate the weights.

4. The apparatus according to claim 1, wherein the weights generated by the weight calculation unit have an upper bound value.

5. The apparatus according to claim 1, wherein the weights generated by the weight calculation unit have a lower bound value.

6. The apparatus according to claim 1, wherein the target signal is used for signal synchronization.

7. The apparatus according to claim 1, wherein the time indices respectively correspond to a plurality of communication paths in a wireless communication environment.

8. The apparatus according to claim 1, wherein the signal selection apparatus is applied to a wireless communication receiver.

9. The apparatus according to claim 1, wherein the weight calculation unit has a weight function.

10. The apparatus according to claim 1, wherein the time index of the target signal is earlier than the time index of the input signal which has the largest energy.

11. A signal selection method, for selecting a target signal from a plurality of input signals, where the input signals correspond to different time indices, the method comprising:
    generating weights for the input signals, the weights being in association with the time indices;
    adjusting energies of the input signals according to the weights respectively, to generate a plurality of processed signals; and selecting one processed signal which has the greatest energy among the processed signals to be the target signal.

12. The method according to claim 11, wherein generating the weights for the input signals comprises generating the weights in a way that the weights are greater at the earlier time indices.

13. The method according to claim 12, wherein generating the corresponding weights for the input signals further comprises:
 adding a first coefficient to the time indices respectively to generate a plurality of first values;
 multiplying the first values by a second coefficient respectively, to form a plurality of second values; and
 adding the second values with a third coefficient respectively to generate the weights.

14. The method according to claim 11, wherein the weight is less than or equal to an upper bound value.

15. The method according to claim 11, wherein the weight is greater than or equal to a lower bound value.

16. The method according to claim 11, wherein the signal selection method is used for signal synchronization.

17. The method according to claim 11, wherein the time indices correspond to a plurality of communication paths in a wireless communication environment.

18. The method according to claim 11, wherein the time index of the target signal is earlier than the time index of the input signal which has the largest energy.

* * * * *